(12) United States Patent
Nakamura

(10) Patent No.: US 10,151,263 B2
(45) Date of Patent: Dec. 11, 2018

(54) INTAKE SYSTEM

(71) Applicant: AISAN KOGYO KABUSHIKI KAISHA, Obu-shi (JP)

(72) Inventor: Takehide Nakamura, Handa (JP)

(73) Assignee: AISAN KOGYO KABUSHIKI KAISHA, Obu-Shi (JP)

( * ) Notice: Subject to any disclaimer, the term of this patent is extended or adjusted under 35 U.S.C. 154(b) by 0 days.

(21) Appl. No.: 15/807,767

(22) Filed: Nov. 9, 2017

(65) Prior Publication Data

US 2018/0142640 A1 May 24, 2018

(30) Foreign Application Priority Data

Nov. 22, 2016 (JP) ................................. 2016-227127

(51) Int. Cl.
*F02M 33/02* (2006.01)
*F02B 47/08* (2006.01)
*F02D 41/18* (2006.01)
*F02D 41/00* (2006.01)
(Continued)

(52) U.S. Cl.
CPC ........... *F02D 41/18* (2013.01); *F02D 41/004* (2013.01); *F02D 41/005* (2013.01); *F02M 25/0836* (2013.01); *F02M 35/10386* (2013.01)

(58) Field of Classification Search
CPC ...... F02D 41/18; F02D 41/004; F02D 41/005; F02D 41/0045; F02D 2200/0406; F02M 35/10386; F02M 25/0836; F02M 25/0818; F02M 26/17; F02M 26/21

USPC ......... 123/306, 399, 568.17, 568.12, 568.21, 123/568.19, 520, 521; 701/103, 108; 73/114.32, 114.33, 114.37, 114.39, 73/114.74

See application file for complete search history.

(56) References Cited

U.S. PATENT DOCUMENTS 5,613,481 A * 3/1997 Kitagawa ............ F02D 41/0032
123/520
5,727,528 A * 3/1998 Hori ..................... F02D 41/0072
123/486
(Continued)

FOREIGN PATENT DOCUMENTS

EP 2128407 A1 12/2009
JP H6-280636 A 10/1994
(Continued)

*Primary Examiner* — Hai Huynh
(74) *Attorney, Agent, or Firm* — Shumaker, Loop & Kendrick, LLP (57) ABSTRACT

An intake system may include a purge supply device; an exhaust gas recirculation device; and a pressure adjustor. The purge supply device may include a purge path connected to an intake path of an engine mounted on a vehicle, and be configured to supply evaporative fuel from a fuel tank to the intake path through the purge path. The exhaust gas recirculation device may include a circulation path connected to the intake path between a throttle valve and a first connecting position connecting the intake path and the purge path, and be configured to supply to the intake path a part of exhaust gas of the engine through the circulation path. The pressure adjustor may be disposed between the first connecting position and a second connecting position connecting the intake path and the circulation path, and be configured to adjust a pressure at the second connecting position.

4 Claims, 2 Drawing Sheets

(51) Int. Cl.
  *F02M 25/08* (2006.01)
  *F02M 35/10* (2006.01)

(56) References Cited

U.S. PATENT DOCUMENTS

| | | | | |
|---|---|---|---|---|
| 6,016,460 A | * | 1/2000 | Olin | F02D 41/0072 701/102 |
| 6,102,003 A | * | 8/2000 | Hyodo | F02D 41/0045 123/436 |
| 6,390,083 B2 | * | 5/2002 | Oki | F02D 41/0042 123/520 |
| 6,438,945 B1 | * | 8/2002 | Takagi | F01N 3/0842 123/520 |
| 6,866,020 B2 | * | 3/2005 | Allston | F02D 9/08 123/399 |
| 6,886,399 B2 | * | 5/2005 | Schnaibel | F02D 11/106 73/114.33 |
| 7,032,580 B2 | * | 4/2006 | Suzuki | F02D 41/0042 123/520 |
| 7,185,641 B2 | * | 3/2007 | Suzuki | F02D 41/0002 123/520 |
| 7,331,334 B2 | * | 2/2008 | Leone | F02M 25/08 123/516 |
| 9,689,351 B2 | | 6/2017 | Ono | |
| 9,714,030 B2 | * | 7/2017 | Dudar | B60W 20/50 |

FOREIGN PATENT DOCUMENTS

| | | |
|---|---|---|
| JP | H7-293347 | 11/1995 |
| JP | H11-062720 | 3/1999 |
| JP | 2008-248729 A | 10/2008 |
| JP | 2014-181681 A | 9/2014 |
| JP | 2016-176337 A | 10/2016 |
| JP | 2018091167 A | 6/2018 |

* cited by examiner

FIG. 1

FIG. 2

INTAKE SYSTEM

TECHNICAL FIELD

The disclosure herein relates to an intake system mounted within an intake and exhaust system of an engine of a vehicle.

BACKGROUND

Japanese Patent Application Publication No. H6-280636 describes a purge supply device that supplies evaporative fuel in a fuel tank to an intake path. The purge supply device is connected to an intake path at a position on an upstream side of a throttle valve. The intake path has a valve device for opening and closing the intake path, arranged thereon at a position on the upstream side of its connecting position with the purge supply device.

SUMMARY

With an aim of mileage improvement and nitrogen oxide reduction, there are cases where an exhaust gas recirculation device is arranged for supplying a part of exhaust gas from an engine to an intake path. When the exhaust gas recirculation device is used together with a purge supply device, a situation may occur in which a negative pressure in the intake path at a connecting position of the exhaust gas recirculation device and the intake path changes due to gas from the purge supply device. In the exhaust gas recirculation device, a flow volume of the exhaust gas to be supplied from the exhaust gas recirculation device to the intake path fluctuates due to the negative pressure in the intake path at the connecting position of the exhaust gas recirculation device and the intake path. Due to this, the flow volume of the exhaust gas supplied from the exhaust gas recirculation device to the intake path fluctuates, and there may be cases where a desired flow volume is difficult to achieve.

The disclosure herein provides a technique for an intake system provided with both a purge supply device and an exhaust gas recirculation device, and that may suppress a flow volume of exhaust gas supplied from the exhaust gas recirculation device to an intake path from fluctuating due to gas supplied from the purge supply device to the intake path.

An intake system disclosed herein may comprise a purge supply device, an exhaust gas recirculation device, and a pressure adjustor. The purge supply device may comprise a purge path connected to an intake path of an engine mounted on a vehicle, and a purge control valve configured to open and close the purge path. The purge supply device may be configured to supply evaporative fuel from a fuel tank to the intake path through the purge path. The exhaust gas recirculation device may comprise a circulation path connected to the intake path between a throttle valve and a first connecting position connecting the intake path and the purge path, and a circulation control valve configured to open and close the circulation path. The exhaust gas recirculation device may be configured to supply to the intake path a part of exhaust gas of the engine through the circulation path. The pressure adjustor may be disposed between the first connecting position and a second connecting position connecting the intake path and the circulation path, and is configured to adjust a pressure at the second connecting position.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved intake systems, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

An intake system disclosed herein may comprise a purge supply device, an exhaust gas recirculation device, and a pressure adjustor. The purge supply device may comprise a purge path connected to an intake path of an engine mounted on a vehicle, and a purge control valve configured to open and close the purge path. The purge supply device may be configured to supply evaporative fuel from a fuel tank to the intake path through the purge path. The exhaust gas recirculation device may comprise a circulation path connected to the intake path between a throttle valve and a first connecting position connecting the intake path and the purge path, and a circulation control valve configured to open and close the circulation path. The exhaust gas recirculation device may be configured to supply to the intake path a part of exhaust gas of the engine through the circulation path. The pressure adjustor may be disposed between the first connecting position and a second connecting position connecting the intake path and the circulation path, and is configured to adjust a pressure at the second connecting position.

In this configuration, the pressure adjustor is arranged between the first connecting position connecting the intake path and the purge path and the second connecting position connecting the intake path and the circulation path. According to this configuration, even when purge gas is supplied from the purge path to the intake path by the purge supply device, gas containing the purge gas is suppressed from flowing to the second connecting position connecting the intake path and the circulation path, and as such, a pressure at the second connecting position connecting the intake path and the circulation path may be adjusted. As a result, the pressure at the second connecting position connecting the intake path and the circulation path may be suppressed from changing. Due to this, a flow volume of exhaust gas supplied from the exhaust gas recirculation device to the intake path may be suppressed from fluctuating.

The vehicle may comprise an air flow volume detector disposed on the intake path at a position on an upstream side of the first connecting position, and configured to detect an air flow volume flowing from atmosphere into the intake path, and an air-fuel ratio detector configured to detect an air-fuel ratio. The intake system may further comprise a controller configured to obtain a concentration of the evaporative fuel in purge gas using the detected air flow volume and the detected air-fuel ratio, which are detected while the purge gas is supplied from the purge supply device. In either of cases where the purge gas is supplied from the purge supply device or not, a total flow volume of the gas supplied to the engine through the intake path does not change. As a result, as compared to the air flow volume flowing through the air flow volume detector during when the purge gas is not supplied, the air flow volume flowing through the air flow volume detector during when the purge gas is being supplied decreases by a flow volume of the purge gas supplied from the purge supply device. Due to this, the flow volume of the purge gas may be estimated using the air flow volume flowing through the air flow volume detector during when the purge gas is being supplied. Further, the air-fuel ratio changes according to an evaporative fuel amount contained in the purge gas, that is, according to the flow volume of the purge gas and the concentration of the evaporative fuel. Due to this, the concentration of the evaporative fuel may be obtained using the changes in the air-fuel ratio and the flow volume of the purge gas.

The controller may be configured to estimate supply air flow volume supplied to the engine using the detected air flow volume which is detected while the purge gas is supplied from the purge supply device and the obtained concentration of the evaporative fuel, and decide a gas flow volume to be supplied from the exhaust gas recirculation device to the intake path using the estimated supply air flow volume. Mileage may be improved if the gas flow volume to be supplied from the exhaust gas recirculation device to the intake path is large relative to the air flow volume to be supplied to the engine, whereas on the other hand, an excessive gas flow volume brings forth a possibility of incomplete combustion occurring in the engine. Due to this, the gas to be supplied from the exhaust gas recirculation device to the intake path may be supplied at a flow volume that is close to an upper limit by which the incomplete combustion does not occur. According to the above configuration, the air flow volume to be supplied to the engine may be estimated. As a result, the estimated air flow volume may be used to suitably determine the gas flow volume that should be supplied to the intake path.

The pressure adjustor may comprise an adjusting valve configured capable of changing a flow path area of the intake path between the first connecting position and the second connecting position. The controller may store first data indicating a relationship between a target gas flow volume to be supplied to the engine and valve apertures of the throttle valve, the circulation control valve, and the adjusting valve corresponding to a required torque of the vehicle while the circulation control valve is opened, second data indicating a relationship between the target gas flow volume and the valve apertures of the throttle valve and the adjusting valve corresponding to the required torque of the vehicle while the circulation control valve is closed, and relationship data indicating a relationship between the air flow volume supplied to the engine and an exhaust gas flow volume supplied from the exhaust gas recirculation device to the intake path. The controller may be configured to adjust the valve aperture of the adjusting valve corresponding to specific required torque based on a difference between the detected air flow volume and the target gas flow volume while the purge control valve and the circulation control valve are closed and the throttle valve and the adjusting valve are opened at the valve apertures of corresponding second data, and adjust the valve aperture of the circulation control valve using the detected air flow volume and the exhaust gas flow volume supplied from the exhaust gas recirculation device to the intake path while the purge control valve is closed, the circulation control valve and the throttle valve are opened at the valve apertures corresponding to the first data, and the adjusting valve is opened at the adjusted valve aperture according to the second data corresponding to the specific required torque. In the above configuration, the throttle valve, the circulation control valve, and the adjusting valve are arranged. These valves may in some cases have actual apertures, which are deviated from their preset apertures, due to design tolerances and manufacturing errors. According to the above configuration, the aperture of the adjusting valve may be adjusted to compensate for differences in the flow volume generated due to the aperture discrepancies in the respective valves. Further, by adjusting the aperture of the circulation control valve after having adjusted the aperture of the adjusting valve, the aperture of the circulation control valve may be adjusted without being influenced by the aperture discrepancies of other valves.

Figure 1:
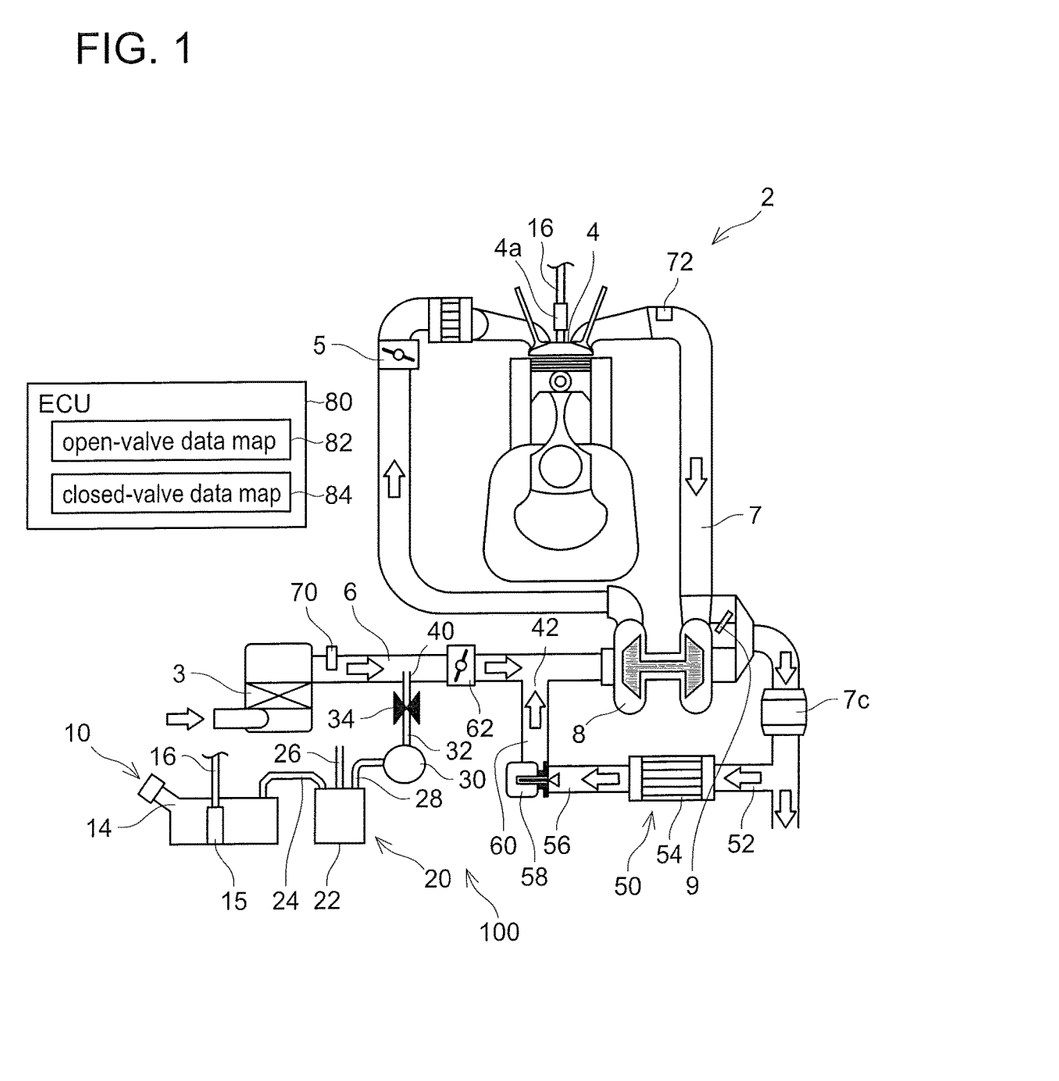
FIG. 1 shows a schematic view of an intake and exhaust system of an engine.

An intake system 100 will be described with reference to the drawings. As shown in FIG. 1, the intake system 100 is arranged in an intake and exhaust system 2 mounted in a vehicle such as an automobile. White arrows shown in FIG. 1 show directions along which gas flows in the intake and exhaust system 2. The intake and exhaust system 2 supplies air from atmosphere to an engine 4, and discharges exhaust gas generated after combustion in the engine 4.

The engine 4 is supplied with fuel from a fuel supply device 10. In the fuel supply device 10, the fuel pressurized by a fuel pump 15 passes through a fuel supply path 16 and is supplied to the engine 4 from an injector 4a.

The intake and exhaust system 2 is provided with an intake path 6, an exhaust path 7, the intake system 100, an air filter 3, a throttle valve 5, and a waste gate valve 9. The intake path 6 guides the air from the atmosphere and that had passed through the air filter 3 into the engine 4. The intake path 6 has the throttle valve 5 arranged thereon. An aperture of the throttle valve 5 is determined according to a torque required according to an accelerator operation by a driver. The throttle valve 5 is controlled by an ECU 80.

The engine 4 combusts the fuel supplied from the fuel supply device 10 by using the air supplied from the intake path 6. Thereafter, the exhaust gas is discharged through the exhaust path 7. The exhaust gas passes through a catalyst 7c arranged on the exhaust path 7.

A turbocharger 8 is arranged at an intermediate position of the intake path 6. The turbocharger 8 rotates a turbine using the exhaust gas passing through the exhaust path 7, by which it compresses the air in the intake path 6 to supply the same to the engine 4. The turbocharger 8 is controlled by the ECU 80.

A volume of the exhaust gas supplied to the turbocharger 8 is adjusted by the waste gate valve 9 arranged on the exhaust path 7. An aperture of the waste gate valve 9 is determined by the ECU 80.

The intake system 100 is connected to the intake path 6 and the exhaust path 7. The intake system 100 includes a purge supply device 20, an exhaust gas recirculation device 50, and an adjusting valve 62. The intake system 100 is controlled by the ECU 80. In other words, portions of the ECU 80 controlling the intake system 100 is an example of "a controller".

The purge supply device 20 supplies evaporative fuel in the fuel tank 14 to the intake path 6. The purge supply device 20 includes purge paths 24, 28, 32, a canister 22, a pump 30, and a control valve 34. The canister 22 is connected to the fuel tank 14 via the purge path 24. The canister 22 adsorbs the evaporative fuel generated in the fuel tank 14. The canister 22 includes activated charcoal for adsorbing the evaporative fuel. The canister 22 is communicated with the atmosphere via an atmospheric port 26.

The canister 22 is further connected to the purge path 28. Mixture gas of the evaporative fuel and the air inside the canister 22 (which will be hereinbelow termed "purge gas") flows from the canister 22 into the purge path 28.

The pump 30 is arranged on the purge path 28. The pump 30 may for example be a vortex pump (which may also be called a cascade pump or Wesco pump) or a centrifugal pump. The pump 30 is controlled by the ECU 80.

The purge path 32 is communicated with the pump 30 at a downstream of the pump 30. The pump 30 pressurizes the purge gas in the purge path 28 and feeds the same. The purge gas fed out to the purge path 32 passes through the purge path 32 and is supplied to the intake path 6.

The control valve 34 is arranged on the purge path 32. The control valve 34 is a solenoid controlled by the ECU 80. The control valve 34 is configured to switch between an opened state in which the valve is open, and a closed state in which the valve is closed. The ECU 80 performs a switching control of consecutively switching the opened state and the closed state of the control valve 34 according to apertures determined according to an air-fuel ratio and the like. In the opened state, the purge path 32 is opened, and the canister 22 and the intake path 6 are thereby communicated. In the closed state, the purge path 32 is closed, and the canister 22 and the intake path 6 are thereby shut off on the purge path 32. The aperture of the control valve 34 indicates a rate of a period of the opened state within a period during one set of the opened state and the closed state that configure a pair by taking place consecutively to each other, when the opened state and the closed state are being consecutively switched. The control valve 34 adjusts its aperture (i.e., a length of the opened state) to adjust a flow volume of the purge gas flowing into the intake path 6.

The adjusting valve 62 is arranged on the intake path 6, at a position on a downstream side of a connecting position 40 connecting the purge path 32 and the intake path 6. The adjusting valve 62 is a butterfly valve. The adjusting valve 62 may be a valve other than the butterfly valve. The adjusting valve 62 is configured to change a flow path area of the intake path 6 according to its aperture. The adjusting valve 62 adjusts a negative pressure in the intake path 6 on the downstream side of the adjusting valve 62 by adjusting an opening area of the intake path 6. The adjusting valve 62 is controlled by the ECU 80.

The exhaust gas recirculation device 50 is connected to the intake path 6 at a position on the downstream side of the adjusting valve 62. Hereinbelow, the exhaust gas recirculation device 50 will be termed an EGR (abbreviation of Exhaust Gas Recirculation) device 50. The EGR device 50 supplies a part of the exhaust gas passing through the exhaust path 7 to the intake path 6. Due to this, this part of the exhaust gas is recirculated to the engine 4. The EGR device 50 includes circulation paths 52, 56, 60, a cooler 54, and an EGR valve 58.

The circulation path 52 is connected to the exhaust path 7 at a position on a downstream side of the catalyst 7c. The catalyst 7c is arranged on the downstream side of the waste gate valve 9. The circulation path 52 is connected to the cooler 54. The cooler 54 cools the exhaust gas passing through the EGR device 50 by a cooling medium. The circulation path 56 is connected to the cooler 54 at a downstream portion of the cooler 54. The exhaust gas cooled in the cooler 54 passes through the circulation path 56 and flows into the circulation path 60. The EGR valve 58 is arranged between the circulation path 56 and the circulation path 60. The EGR valve 58 is a butterfly valve. The EGR valve 58 may be a valve other than the butterfly valve. The EGR valve 58 is controlled by the ECU 80.

The circulation path 60 is connected to the intake path 6. A connecting position 42 of the circulation path 60 and the intake path 6 is positioned on the downstream side of both the connecting position 40 and the adjusting valve 62. In other words, the adjusting valve 62 is arranged between the connecting position 40 and the connecting position 42.

The ECU (abbreviation of Engine Control Unit) 80 includes a CPU and a memory such as a ROM and a RAM. The ECU 80 controls operations of the engine 4. The ECU 80 controls each of the control valve 34, the adjusting valve 62, the EGR valve 58, the throttle valve 5, and the waste gate valve 9 of the intake and exhaust system 2. The ECU 80 stores an open-valve data map 82, in which the torque required according to the accelerator operation by the driver (hereafter termed "required torque") in a case where the EGR valve 58 is remaining open, that is, when the exhaust gas is being supplied to the intake path 6 from the EGR device 50, is associated with the apertures of the adjusting valve 62, the EGR valve 58, the throttle valve 5, and the waste gate valve 9 therefor and a target flow volume of gas to be supplied to the engine 4 (hereafter termed "target gas flow volume"). The "gas" includes air to be supplied to the engine 4 through the air filter 3. Further, if the exhaust gas is being supplied to the intake path 6 from the EGR device 50, the "gas" further includes the exhaust gas supplied to the engine 4, and if the purge gas is being supplied to the intake path 6 from the purge supply device 20, the "gas" further includes the purge gas supplied to the engine 4. Further, the ECU 80 stores a closed-valve data map 84, in which the required torque for a case where the EGR valve 58 is remaining closed, that is, when the exhaust gas is not being supplied to the intake path 6 from the EGR device 50, is associated with the apertures of the adjusting valve 62, the throttle valve 5, and the waste gate valve 9 therefor and the target flow volume. The data maps 82, 84 are identified in advance by experiments for identifying the apertures of the adjusting valve 62, the EGR valve 58, the throttle valve 5, and the waste gate valve 9 and the target gas flow volume enabling the engine 4 to output the required torque, and are stored in the ECU 80.

In the open-valve data map 82 and the closed-valve data map 84, the aperture of the adjusting valve 62 is defined by a drive amount of an actuator that drives the adjusting valve 62. In the adjusting valve 62, its aperture may exhibit variations depending on design tolerances and manufactural errors. Due to this, even if the actuator is driven according to the open-valve data map 82 and the closed-valve data map 84, there are some cases where the actual aperture of the adjusting valve 62 may be deviated from its expected aperture. The same issue exists with the EGR valve 58, the throttle valve 5, and the waste gate valve 9.

Further, the ECU 80 is connected to an air-fuel ratio sensor 72 arranged within the exhaust path 7. The ECU 80 detects an air-fuel ratio in the exhaust path 7 from detection results from the air-fuel ratio sensor 72, and controls a fuel injection amount from the injector 4a based on the detected air-fuel ratio.

Further, the ECU 80 is connected to an air flowmeter 70 arranged in a vicinity of the air filter 3. The air flowmeter 70 is a so-called hot wire type of air flowmeter, however, it may have another configuration. The air flowmeter 70 is arranged on an upstream side of the connecting position 40. The ECU 80 uses the air flowmeter 70 to detect a flow volume of an air supplied from the atmosphere through the air filter 3 to the intake path 6.

Next, an operation of the intake system 100 upon when the engine 4 runs will be described. During when the engine 4 is running, the ECU 80 controls the adjusting valve 62, the EGR valve 58, the throttle valve 5, and the waste gate valve 9 according to the required torque. Due to this, the gas of the target gas flow volume is supplied to the engine 4.

Further, when a purge condition is satisfied during when the engine 4 is running, the ECU 80 switch controls the control valve 34 to perform a purging process. The purge condition is a condition that is satisfied when the purging process of supplying the purge gas to the engine 4 should be performed, and is a condition set in the ECU 80 in advance by a manufacturer according to cooling water temperature in the engine 4, an identified situation of a purge concentration, and the like. The ECU 80 continuously monitors whether or not the purge condition is satisfied during when the engine 4 is running.

In the purging process, the purge gas is supplied to the intake path 6 on the upstream side of the adjusting valve 62 from the canister 22 through the purge paths 28, 32.

Further, the ECU 80 adjusts the aperture of the EGR valve 58 to supply the exhaust gas to the intake path 6. The exhaust gas is drawn into the intake path 6 from the circulation path 60 due to the negative pressure in the intake path 6. At a timing when the exhaust gas is supplied from the EGR device 50 to the intake path 6, a flow path area of the intake path 6 is narrowed by the adjusting valve 62, and the negative pressure in the intake path 6 at the connecting position 42 is stably maintained. As a result, the negative pressure in the intake path 6 at the connecting position 42 can be suppressed from fluctuating due to the purge gas supply, even if the purge gas is supplied from the purge supply device 20 to the intake path 6 during when the exhaust gas is being supplied from the EGR device 50 to the intake path 6. Due to this, fluctuation of the flow volume of the exhaust gas can be suppressed, and a device for estimating the exhaust gas flow volume and a device for correcting the exhaust gas flow volume do not need to be additionally provided.

Figure 2:
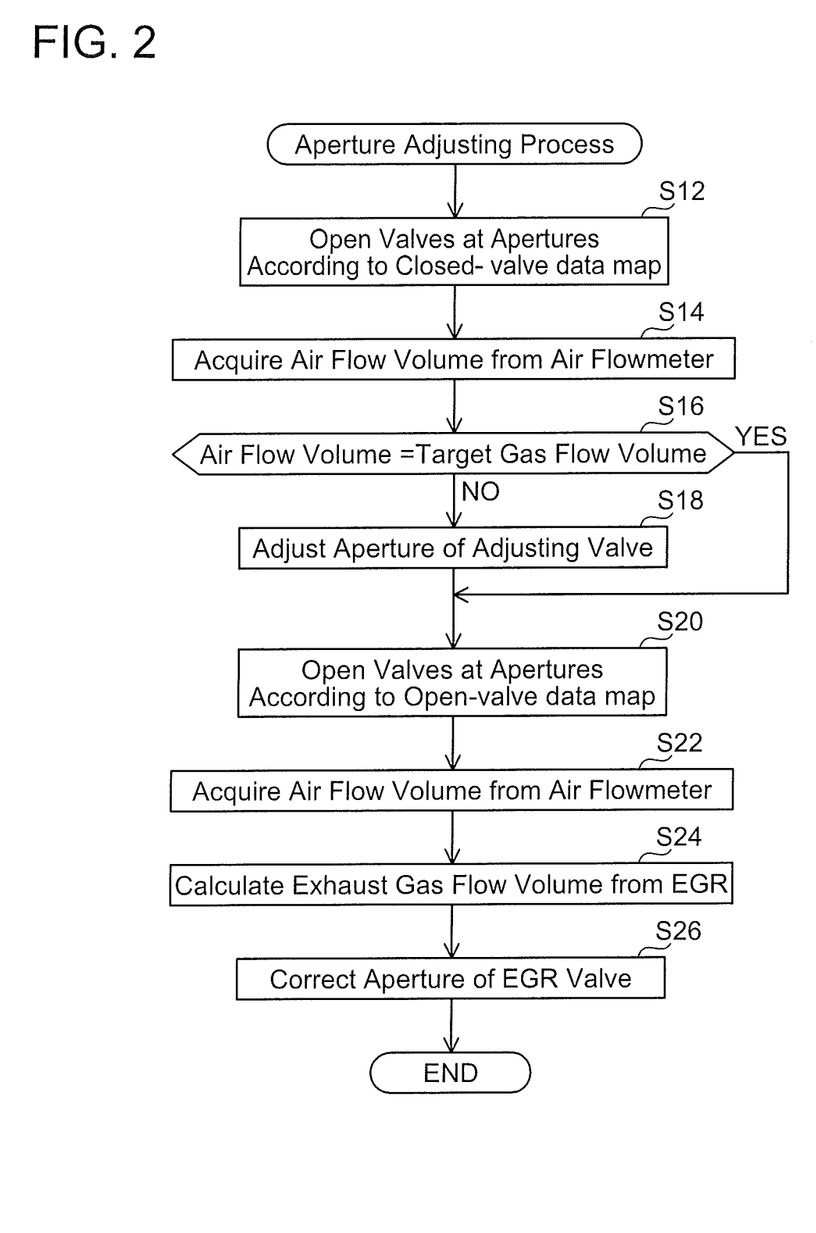
FIG. 2 shows a flow chart of an aperture adjusting process.

Next, an aperture adjusting process performed by the ECU 80 will be described. As aforementioned, the apertures of the adjusting valve 62, the EGR valve 58, the throttle valve 5, and the waste gate valve 9 may in some cases be deviated from their targeted apertures. In the aperture adjusting process, a discrepancy in the gas flow volume caused by the aperture deviations is corrected by adjusting the apertures of the adjusting valve 62 and the EGR valve 58.

The aperture adjusting process is started at a timing when the exhaust gas is not supplied from the EGR device 50 to the intake path 6, for example, during a cold start. The ECU 80 does not perform the purging process during when the aperture adjusting process is being performed. In the aperture adjusting process, firstly in S12, the ECU 80 opens the adjusting valve 62, the throttle valve 5, and the waste gate valve 9 by the apertures according to the closed-valve data map 84 corresponding to the required torque.

Next, in S14, the ECU 80 acquires the air flow volume detected by the air flowmeter 70. At a timing when the process of S14 is performed, both the purge gas from the purge supply device 20 and the exhaust gas from the EGR device 50 are not supplied to the intake path 6. Due to this, the air flow volume detected by the air flowmeter 70 matches the air flow volume to be supplied to the engine 4.

Next, in S16, the ECU 80 determines whether or not the air flow volume acquired in S14 matches the target gas flow volume recorded in the closed-valve data map 84. If the air flow volume acquired in S14 does not match the target gas flow volume (NO in S16), the ECU 80 adjusts the aperture of the adjusting valve 62 in S18 so that the air flow volume detected by the air flowmeter 70 comes to match the target gas flow volume. Further, the aperture of the adjusting valve 62 in the closed-valve data map 84 and in the open-valve data map 82 is corrected. For example, when the aperture of the adjusting valve 62 corresponding to the current required torque is changed by $\mu\%$, the aperture of the adjusting valve 62 corresponding to other required torque is also changed by $\mu\%$. When the process of S18 ends, the ECU 80 proceeds to S20.

On the other hand, if the air flow volume acquired in S14 matches the target gas flow volume (YES in S16), the ECU 80 skips S18 and proceeds to S20.

In S20, the ECU 80 opens the EGR valve 58, the adjusting valve 62, the throttle valve 5, and the waste gate valve 9 by their apertures according to the open-valve data map 82 corresponding to the required torque. Then, in S22, the ECU 80 acquires the air flow volume detected by the air flowmeter 70 similarly to S14. Then, in S24, the ECU 80 calculates the exhaust gas flow volume supplied from the EGR device 50 to the intake path 6. Specifically, the ECU 80 calculates the exhaust gas flow volume by subtracting the air flow volume detected in S22 from the target gas flow volume.

Under a state in which the exhaust gas is being supplied from the EGR device 50 to the intake path 6, the gas flow volume supplied to the engine 4 equals a total flow volume of the air flow volume detected by the air flowmeter 70 and the exhaust gas flow volume supplied from the EGR device 50 to the intake path 6. As aforementioned, the apertures of respective valves are adjusted in the processes leading to S20 as above so that the gas flow volume supplied to the engine 4 matches the target gas flow volume. Due to this, the gas flow volume supplied to the engine 4 matches the target gas flow volume. Based on this fact, the exhaust gas flow volume can be calculated by subtracting the air flow volume detected in S22 from the target gas flow volume.

Next, in S26, the ECU 80 adjusts the aperture of the EGR valve 58 so that a relationship between the air flow volume detected by the air flowmeter 70 and the exhaust gas flow volume matches a preset target EGR rate. In the intake system 100, the target EGR rate is preset so that the exhaust gas flow volume from the EGR device 50 is set at a value that does not exceed an upper limit flow volume by which incomplete combustion does not occur in the engine 4 (that is equal to or less than the upper limit flow volume that can prevent the incomplete combustion in the engine 4). The EGR rate is identified by: EGR rate=exhaust gas flow volume/((air flow volume+exhaust gas flow volume) supplied to the engine 4). More specifically, when the purging process is not being performed, EGR rate=exhaust gas flow volume/(air flow volume detected by the air flowmeter 70+exhaust gas flow volume) is established, and when the purging process is being performed, EGR rate=exhaust gas flow volume/(air flow volume detected by the air flowmeter 70+air flow volume supplied from the purge supply device 20+exhaust gas flow volume) is established. The air flow volume supplied from the purge supply device 20 is a value obtained by subtracting the flow volume of the evaporative fuel from the flow volume of the purge gas. The mileage of the vehicle can be improved by maintaining the exhaust gas flow volume to a value close to the upper limit EGR rate by which the incomplete combustion does not occur in the engine 4. It should be noted that the target EGR rate is identified by experiments in advance, and is stored in the ECU 80.

In S26, since the purging process is not being performed, the aperture of the EGR valve 58 is adjusted so that the EGR rate=exhaust gas flow volume/(air flow volume detected by the air flowmeter 70+exhaust gas flow volume) matches the target EGR rate. Further, in S26, the aperture of the EGR valve 58 in the open-valve data map 82 is corrected similarly to S18, and then the aperture adjusting process is completed.

According to this configuration, in cases where the gas flow volume supplied to the engine 4 deviates from the target gas flow volume due to the deviations in the respective apertures of the EGR valve 58, the adjusting valve 62, the throttle valve 5, and the waste gate valve 9, the deviations in the apertures of the EGR valve 58, the adjusting valve 62, the throttle valve 5, and the waste gate valve 9 can be corrected by adjusting the aperture of at least one of the EGR valve 58 and the adjusting valve 62. As a result, the apertures of the throttle valve 5 and the waste gate valve 9 do not need to be adjusted.

When the aperture adjusting process is completed, the ECU 80 allows the purging process to be performed. As a result, when the purge condition is satisfied, the ECU 80 switch controls the control valve 34 and drives the pump 30 to supply the purge gas to the intake path 6. Due to this, the total flow volume supplied to the engine 4 does not change, and the air flow volume flowing into the intake path 6 from the atmosphere, that is, the air flow volume detected by the air flowmeter 70, decreases by the flow volume of the purge gas. The ECU 80 calculates the difference in the air flow volume detected by the air flowmeter 70 before and after the start of the purging process to identify the flow volume of the purge gas. According to this configuration, the ECU 80 can correct variations in the flow volume of the purge gas by the pump 30 and the control valve 34 using the identified flow volume of the purge gas. Due to this, a pump 30 and a control valve 34 having relatively large variations in the flow volume of the purge gas can be used. In other words, the variations in the pump 30 and the control valve 34 caused upon manufacture thereof can be tolerated.

Further, when the evaporative fuel contained in the purge gas is supplied to the engine 4, the air-fuel ratio moves toward a rich side. The ECU 80 identifies an evaporative fuel amount using the changes in the air-fuel ratio after the purging process has been started. Due to this, the ECU 80 can calculate a concentration of the evaporative fuel in the purge gas (hereafter termed "purge concentration") by using the flow volume of the purge gas and the evaporative fuel amount in the purge gas.

The ECU 80 can adjust the air-fuel ratio to a desired air-fuel ratio at an early stage after the purging process has been started by adjusting the aperture of the control valve 34 and the fuel injection amount of the injector 4*a* using the calculated purge concentration.

Further, when the purging process is started, the gas supplied to the engine 4 from the intake path 6 comes to contain the evaporative fuel. As a result, since the target gas flow volume remains constant, the air flow volume supplied to the engine 4 thereby decreases. This air flow volume decreases by the evaporative fuel amount contained in the purge gas. The ECU 80 estimates a supply air flow volume to be supplied to the engine 4 by using the air flow volume detected by the air flowmeter 70 and the air flow volume contained in the purge gas, as identified from the flow volume of the purge gas and the purge concentration. The ECU 80 adjusts the aperture of the EGR valve 58 such that a relationship between the estimated supply air flow volume and the exhaust gas flow volume from the EGR device 50 matches the target EGR rate. Due to this, the ECU 80 determines the exhaust gas flow volume to be supplied from the EGR device 50 to the intake path 6.

In the intake system 100 of the present embodiment, the adjusting valve 62 is arranged on the upstream side of the connecting position 42 connecting the EGR device 50 and the intake path 6. Due to this, at the timing when the exhaust gas is supplied from the EGR device 50 to the intake path 6, the negative pressure in the intake path 6 at the connecting position 42 can be made large by narrowing the flow path area of the intake path 6 using the adjusting valve 62. Due to this, the exhaust gas can smoothly be supplied from the EGR device 50 to the intake path 6.

Further, since the negative pressure in the intake path 6 at the connecting position 42 can be made large, the exhaust gas can smoothly be supplied from the EGR device 50 to the intake path 6 even if flow path areas of the circulation paths 52, 56, 60 of the EGR device 50 are narrowed. Due to this, a size of the EGR valve 58 can be made compact.

Moreover, the adjusting valve 62 is arranged between the connecting position 40 connecting the purge supply device 20 and the intake path 6, and the connecting position 42 connecting the EGR device 50 and the intake path 6. Due to this, in a situation in which the flow volume of the gas flowing into the connecting portion 42 is being restricted by the adjusting valve 62, the negative pressure in the intake path 6 at the connecting portion 42 can be suppressed from dropping even if the purge gas is supplied from the purge supply device 20 to the intake path 6. Due to this, the exhaust gas flow volume supplied from the EGR device 50 to the intake path 6 can be suppressed from fluctuating by being influenced by the purging process. That is, since a fluctuation range of the exhaust gas flow volume supplied from the EGR device 50 becomes smaller, the EGR rate to be targeted can be set high while avoiding an occurrence of the incomplete combustion in the engine 4, which may occur as a result of having supplied excessive exhaust gas flow volume.

(Corresponding Relationships)

The required torque in S20 is "specific required torque". The target EGR rate is an example of "relationship data". The EGR valve 58 is an example of a "circulation control valve". The air flowmeter 70 is an example of an "air flow volume detector", and the air-fuel ratio sensor 72 is an example of an "air-fuel ratio detector".

Specific examples of the present invention have been described in detail, however, these are mere exemplary indications and thus do not limit the scope of the claims. The art described in the claims includes modifications and variations of the specific examples presented above.

(1) In the above embodiment, the adjusting valve 62 is arranged between the connecting position 40 connecting the purge supply device 20 and the intake path 6, and the connecting position 42 connecting the EGR device 50 and the intake path 6. However, in addition to the adjusting valve 62, or as a substitution to the adjusting valve 62, a stop for narrowing the flow path area of the intake path 6 may be arranged between the connecting position 40 and the connecting position 42. In this variant, the stop and the adjusting valve 62, or the stop by itself are an example of a "pressure adjustor".

(2) In the above embodiment, the supercharger 8 is arranged in the intake and exhaust system 2. However, the supercharger 8 may not be arranged therein. In this case, the waste gate valve 9 also may not be arranged.

(3) In the above embodiment, the purge supply device 20 includes the pump 30. However, the purge supply device 20 may not be provided with the pump 30.

(4) In the ECU 80, its module for controlling the intake system 100 may be arranged separate from the ECU 80.

(5) In the aperture adjusting process, the ECU 80 may perform the processes of S12 to S18, that is, the processes during when the EGR valve 58 is closed, and the processes of S20 to S26 separately. For example, the ECU 80 may perform each set of the processes of S12 to S18 and the processes of S20 to S26 at timings when the respective valves are adjusted to their predetermined apertures.

(6) The waste gate valve 9 may not be arranged.

(7) The ECU 80 may store in advance a data map indicating a relationship between the air flow volume and the exhaust gas flow volume which are supplied to the engine 4, for example, instead of the target EGR rate. In this case, the ECU 80 may adjust the aperture of the EGR valve 58 in the process of S26 by using the target gas flow volume (i.e., the total of the air flow volume and the exhaust gas supplied to the engine 4), the exhaust gas flow volume calculated in S24, and the data map. In this variant, the data map is an example of the "relationship data".

(8) In the above embodiment, the adjusting valve 62 adjusts the negative pressure in the intake path 6 on the downstream side of the adjusting valve 62. However, the adjusting valve 62 may adjust the pressure in the intake path 6 on the downstream side of the adjusting valve 62 by adjusting the gas volume flowing from the intake path 6 on the upstream side of the adjusting valve 62 to the intake path 6 on the downstream side of the adjusting valve 62, when the intake path 6 on the downstream side of the adjusting valve 62 exhibits a positive pressure. In this case, for example, a pump or the like for pressurizing the exhaust gas and feeding it to the intake path 6 side may be arranged in the EGR device 50.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:
1. An intake system comprising:
a purge supply device;
an exhaust gas recirculation device; and
a pressure adjustor,
wherein the purge supply device comprises:
a purge path connected to an intake path of an engine mounted on a vehicle; and
a purge control valve configured to open and close the purge path, and
the purge supply device is configured to supply evaporative fuel from a fuel tank to the intake path through the purge path,
the exhaust gas recirculation device comprises:
a circulation path connected to the intake path between a throttle valve and a first connecting position connecting the intake path and the purge path; and
a circulation control valve configured to open and close the circulation path, and
the exhaust gas recirculation device is configured to supply to the intake path a part of exhaust gas of the engine through the circulation path, and
the pressure adjustor is disposed between the first connecting position and a second connecting position connecting the intake path and the circulation path, and is configured to adjust a pressure at the second connecting position.

2. The intake system as in claim 1, wherein
the vehicle comprises:
an air flow volume detector disposed on the intake path at a position on an upstream side of the first connecting position, and configured to detect an air flow volume flowing from atmosphere into the intake path; and
an air-fuel ratio detector configured to detect an air-fuel ratio, and
the intake system further comprises a controller configured to obtain a concentration of the evaporative fuel in purge gas using the detected air flow volume and the detected air-fuel ratio, which are detected while the purge gas is supplied from the purge supply device.

3. The intake system as in claim 2, wherein
the controller is configured to:
estimate a supply air flow volume supplied to the engine using the detected air flow volume which is detected while the purge gas is supplied from the purge supply device and the obtained concentration of the evaporative fuel; and
decide a gas flow volume to be supplied from the exhaust gas recirculation device to the intake path using the estimated supply air flow volume.

4. The intake system as in claim 2, wherein
the pressure adjustor comprises an adjusting valve configured capable of changing a flow path area of the intake path between the first connecting position and the second connecting position,
the controller stores:
first data indicating a relationship between a target gas flow volume to be supplied to the engine and valve apertures of the throttle valve, the circulation control valve, and the adjusting valve corresponding to required torque of the vehicle while the circulation control valve is opened;
second data indicating a relationship between the target gas flow volume and the valve apertures of the throttle valve and the adjusting valve corresponding to the required torque of the vehicle while the circulation control valve is closed; and
relationship data indicating a relationship between the air flow volume supplied to the engine and an exhaust gas flow volume supplied from the exhaust gas recirculation device to the intake path, and the controller is configured to:
  adjust the valve aperture of the adjusting valve corresponding to specific required torque based on a difference between the detected air flow volume and the target gas flow volume while the purge control valve and the circulation control valve are closed, and the throttle valve and the adjusting valve are opened at the valve apertures according to the second data; and
  adjust the valve aperture of the circulation control valve using the detected air flow volume and the exhaust gas flow volume supplied from the exhaust gas recirculation device to the intake path while the purge control valve is closed, the circulation control valve and the throttle valve are opened at the valve apertures according to the first data, and the adjusting valve is opened at the adjusted valve aperture according to the second data corresponding to the specific required torque.

* * * * *